US008123234B2

(12) United States Patent
Tomita et al.

(10) Patent No.: US 8,123,234 B2
(45) Date of Patent: Feb. 28, 2012

(54) CHUCK APPARATUS

(75) Inventors: Seiji Tomita, Yokosuka (JP); Motohiro Sotome, Ayase (JP)

(73) Assignee: SMC Kabushiki Kaisha, Tokyo (JP)

( * ) Notice: Subject to any disclaimer, the term of this patent is extended or adjusted under 35 U.S.C. 154(b) by 1230 days.

(21) Appl. No.: 11/774,981

(22) Filed: Jul. 9, 2007

(65) Prior Publication Data
US 2008/0023925 A1    Jan. 31, 2008

(30) Foreign Application Priority Data

Jul. 31, 2006   (JP) ................................. 2006-208994

(51) Int. Cl.
*B23B 31/30*     (2006.01)
*B23B 31/163*    (2006.01)
*B25J 15/00*     (2006.01)

(52) U.S. Cl. ....... 279/4.12; 279/114; 279/116; 279/134; 279/137; 269/164; 294/207; 901/31

(58) Field of Classification Search ................ 279/4.01, 279/4.1, 4.12, 110, 114–116, 134, 137; 269/110, 269/118, 164; 294/207; 901/31, 37–39; B23B 31/30, 31/163; B25J 15/00
See application file for complete search history.

(56) References Cited

U.S. PATENT DOCUMENTS

| 2,938,733 | A | * | 5/1960 | Judelson | 279/137 |
|---|---|---|---|---|---|
| 3,751,053 | A | * | 8/1973 | Swanson | 279/119 |
| 3,797,837 | A | * | 3/1974 | Roddy et al. | 279/114 |
| 3,975,030 | A | * | 8/1976 | Akeel et al. | 279/4.12 |
| 4,482,162 | A | * | 11/1984 | Anegawa | 279/4.12 |
| 5,551,677 | A | | 9/1996 | Puettmer et al. | |
| 5,657,534 | A | | 8/1997 | Yi | |
| 5,944,326 | A | * | 8/1999 | Ishibashi et al. | 279/4.04 |
| 6,220,608 | B1 | * | 4/2001 | Varnau | 279/114 |
| 6,460,862 | B1 | * | 10/2002 | Shimizu | 279/4.12 |
| 6,467,775 | B1 | * | 10/2002 | Denzinger | 279/4.12 |
| 6,601,856 | B2 | * | 8/2003 | Bohler | 279/4.01 |
| 2004/0187301 | A1 | | 9/2004 | Matsumura et al. | |
| 2009/0127879 | A1 | * | 5/2009 | Maffeis | 294/88 |

FOREIGN PATENT DOCUMENTS

| DE | 92 18 907 | 2/1996 |
|---|---|---|
| DE | 10 2004 014 567 | 12/2005 |
| JP | 02-139086 | 11/1990 |
| JP | 06-226658 | 8/1994 |
| JP | 07-205080 | 8/1995 |
| JP | 08-130396 | 5/1996 |
| JP | 09-109081 | 4/1997 |
| JP | 2004-174702 | 6/2004 |
| JP | 2004-215771 | 8/2004 |
| JP | 2005-59118 | 3/2005 |
| JP | 2005-118931 | 5/2005 |
| JP | 2005-161454 | 6/2005 |
| KR | 10-0297675 | 5/2001 |

* cited by examiner

*Primary Examiner* — Eric A Gates
(74) *Attorney, Agent, or Firm* — Paul A. Guss

(57) ABSTRACT

A pair of gripping sections performs opening and closing operations along a base member through displacement of a piston by means of a pressure fluid supplied to a chuck body. A pair of fingers, which constitute the gripping sections, is openable and closable in directions perpendicular to opening/closing directions of the gripping sections, by means of a driving force supplied from a driving section. The gripping sections are positioned with respect to a workpiece by actuating the pair of fingers to perform the opening/closing operation. Thereafter, by supplying the pressure fluid, the workpiece is gripped at a desired gripping position by means of the gripping sections.

9 Claims, 10 Drawing Sheets

CHUCK APPARATUS

BACKGROUND OF THE INVENTION

1. Field of the Invention

The present invention relates to a chuck apparatus capable of gripping a workpiece by allowing a gripping mechanism to perform an opening/closing operation.

2. Description of the Related Art

Conventionally, a chuck apparatus is known, which is attached, for example, to the forward end of a machine tool and which grips, for example, a variety of parts by allowing the chuck to perform an opening/closing operation by means of a driving force. The present applicant has proposed a chuck apparatus provided with a pair of gripping pawls, which are openable and closable by means of the driving force brought about by a driving source such as a motor (see Japanese Laid-Open Patent Publication No. 2005-161454). In general, when a variety of workpieces having different shapes are gripped, a plurality of chuck apparatuses as described above are combined, wherein a given chuck apparatus is used properly and separately depending on the shapes of the workpieces, in response to situations in which the portion to be gripped differs depending on the workpiece. However, in recent years, there has been a demand for a single chuck apparatus, which is capable of gripping a variety of different workpieces.

SUMMARY OF THE INVENTION

A general object of the present invention is to provide a chuck apparatus, which makes it possible to freely displace a gripping mechanism depending on the shape of a workpiece, so that the workpiece can be reliably gripped at a desired position.

The above and other objects, features, and advantages of the present invention will become more apparent from the following descriptions when taken in conjunction with accompanying drawings, in which a preferred embodiment of the present invention is shown by way of illustrative example.

DESCRIPTION OF THE PREFERRED EMBODIMENTS

Figure 1:
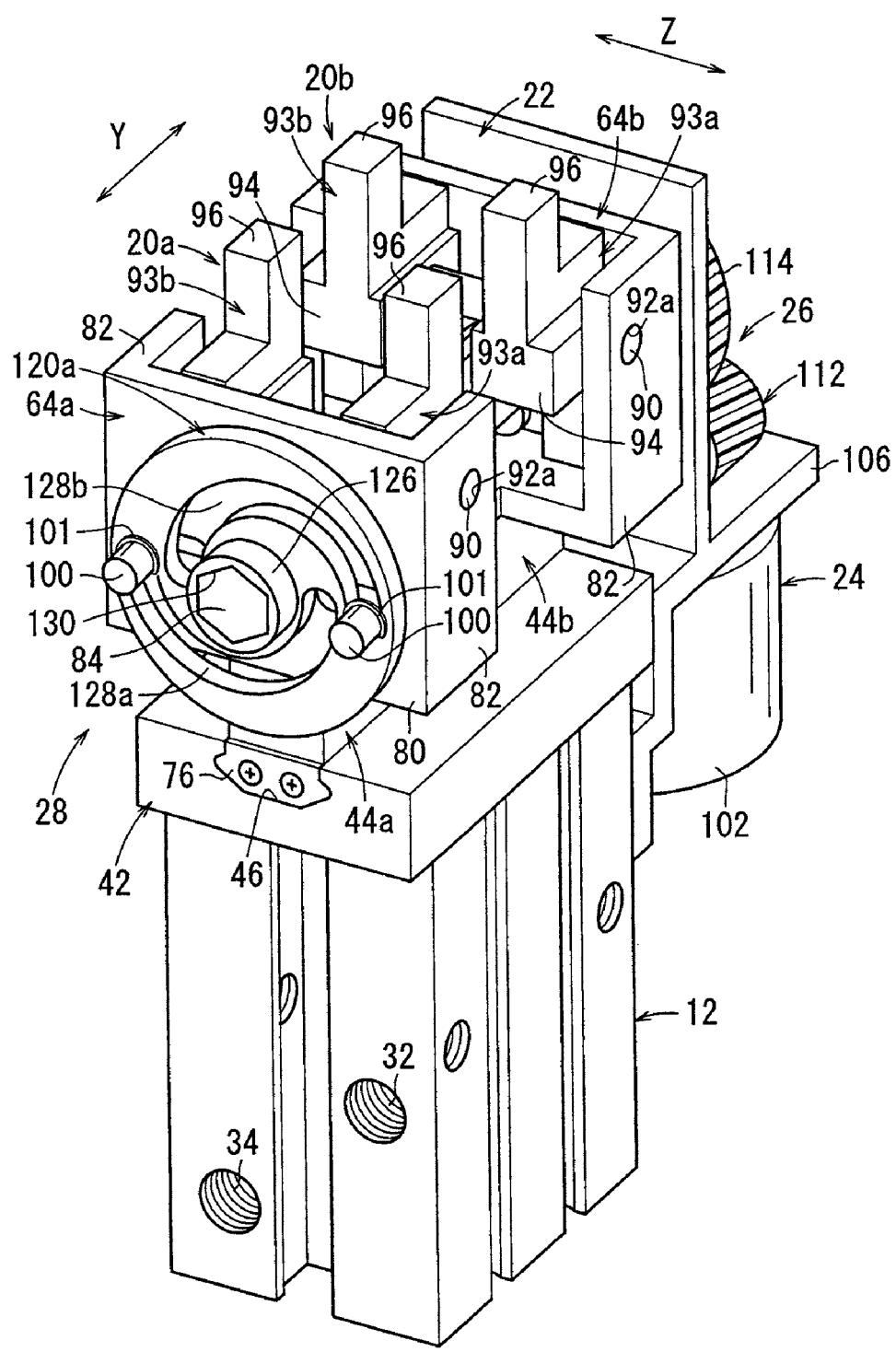
FIG. 1 is a perspective view illustrating the appearance of a chuck apparatus according to an embodiment of the present invention.

With reference to FIG. 1, reference numeral 10 indicates a chuck apparatus according to an embodiment of the present invention.

As shown in FIGS. 1 to 7, the chuck apparatus 10 comprises a chuck body (body) 12 having a cylindrical shape, a piston 14 provided displaceably within the chuck body 12, and a gripping mechanism 22 having a pair of gripping sections (first gripping sections) 20a, 20b that perform opening and closing operations by the aid of levers 18a, 18b, which are engaged with a rod section 16 of the piston 14. The chuck apparatus 10 further comprises a driving section 24 installed on a side portion of the chuck body 12, a gear mechanism 26 that changes the speed of the driving force output from the driving section 24, and a cam mechanism (converting mechanism) 28 that converts a rotary displacement driving force into a linear displacement driving force in the horizontal direction, and for transmitting the driving force to the gripping mechanism 22.

The chuck body 12 has a substantially rectangular cross section. A through-hole 30 (see FIG. 3), which penetrates in the axial direction, is formed in the chuck body 12. Further, first and second ports 32, 34, which supply the pressure fluid to the inside of the through-hole 30, open on a side surface of the chuck body 12.

A cap 36 is fitted into an open one end side of the through-hole 30, wherein the through-hole 30 is closed by the cap 36. An annular seal member 38 is installed on an outer circumferential surface of the cap 36. Therefore, the seal member 38 abuts against the inner circumferential surface of the through-hole 30, for thereby maintaining air tightness of the through-hole 30. The cap 36 is retained by a fastening ring 40, which is installed on an inner circumferential surface of the through-hole 30.

The first and second ports 32, 34 are separated from each other by a predetermined distance in the axial direction of the chuck body 12 (in the direction of the arrows X1, X2). The first port 32 communicates with one end surface of the piston 14 (in the direction of the arrow X1). The second port 34 communicates with the space disposed between the cap 36 and the other end surface of the piston 14. An unillustrated pressure fluid supply source is connected to the first and second ports 32, 34.

A plate-shaped base member 42 is connected to the other end of the chuck body 12. A rail groove 46, in which a pair of displacement blocks 44a, 44b of the gripping mechanism 22 are guided displaceably, is formed in the base member 42. The rail groove 46 has a linear form and is disposed on the side surface of the base member 42 opposite to the chuck body 12. Further, the rail groove 46 extends in the longitudinal direction (direction of the arrow Y) substantially perpendicular to the axis of the chuck body 12 (see FIGS. 5 and 6).

A damper 48 made of an elastic material such as rubber, for example, is installed on one end surface of the piston 14 in order to buffer impacts caused when the piston 14 is displaced toward the gripping mechanism 22 (in the direction of the arrow X1) and abuts against the inner wall surface of the through-hole 30.

On the other hand, the piston 14 is disposed such that an outer circumferential surface of the piston 14 makes sliding contact along the inner circumferential surface of the through-hole 30. A piston packing 50, which is installed in an annular groove of the outer circumferential surface, abuts against the inner circumferential surface. Accordingly, air tightness is appropriately retained within the through-hole 30 on both end surfaces of the piston 14.

A magnet 52 is disposed adjacent to the piston packing 50, on the outer circumferential surface of the piston 14. The magnetic force of the magnet 52 is sensed by an unillustrated position-detecting sensor, in order to confirm the displacement position of the piston 14.

The rod section 16, which is reduced in diameter in a radially inward direction and extends toward the gripping mechanism 22 (in the direction of the arrow X1), is provided on one end surface side of the piston 14. The other end surface of the piston 14 opposes the cap 36. The rod section 16 is inserted into a rod hole 54, which is reduced in diameter as compared with the through-hole 30. A rod packing 56 provided on the inner circumferential surface of the rod hole 54 abuts against the outer circumferential surface.

The levers 18a, 18b are rotatably engaged with the rod section 16 by the aid of a pin 58. Each of the levers 18a, 18b has a substantially L-shaped cross section. Substantially central portions of the levers 18a, 18b, which are bent, are rotatably supported respectively by a pair of link pins 60 provided on the chuck body 12. A cutout 62, cut in a semicircular shape, is formed at one end side of each of the levers 18a, 18b. The cutouts 62 engage respectively with the pin 58, which is installed on the end of the rod section 16.

On the other hand, each of the levers 18a, 18b is formed such that the shaft portion thereof becomes gradually thinner from the portion supported by the link pins 60 toward the other end side. The levers 18a, 18b are rotatably supported respectively within the displacement blocks 44a, 44b that make up the gripping mechanism 22.

That is, the pair of levers 18a, 18b undergo rotary displacement, such that the other ends mutually approach one another or separate from each other, by means of the link pins 60, and under a displacement action of the rod section 16, in the axial direction (in the directions of the arrows X1, X2).

Figure 5:
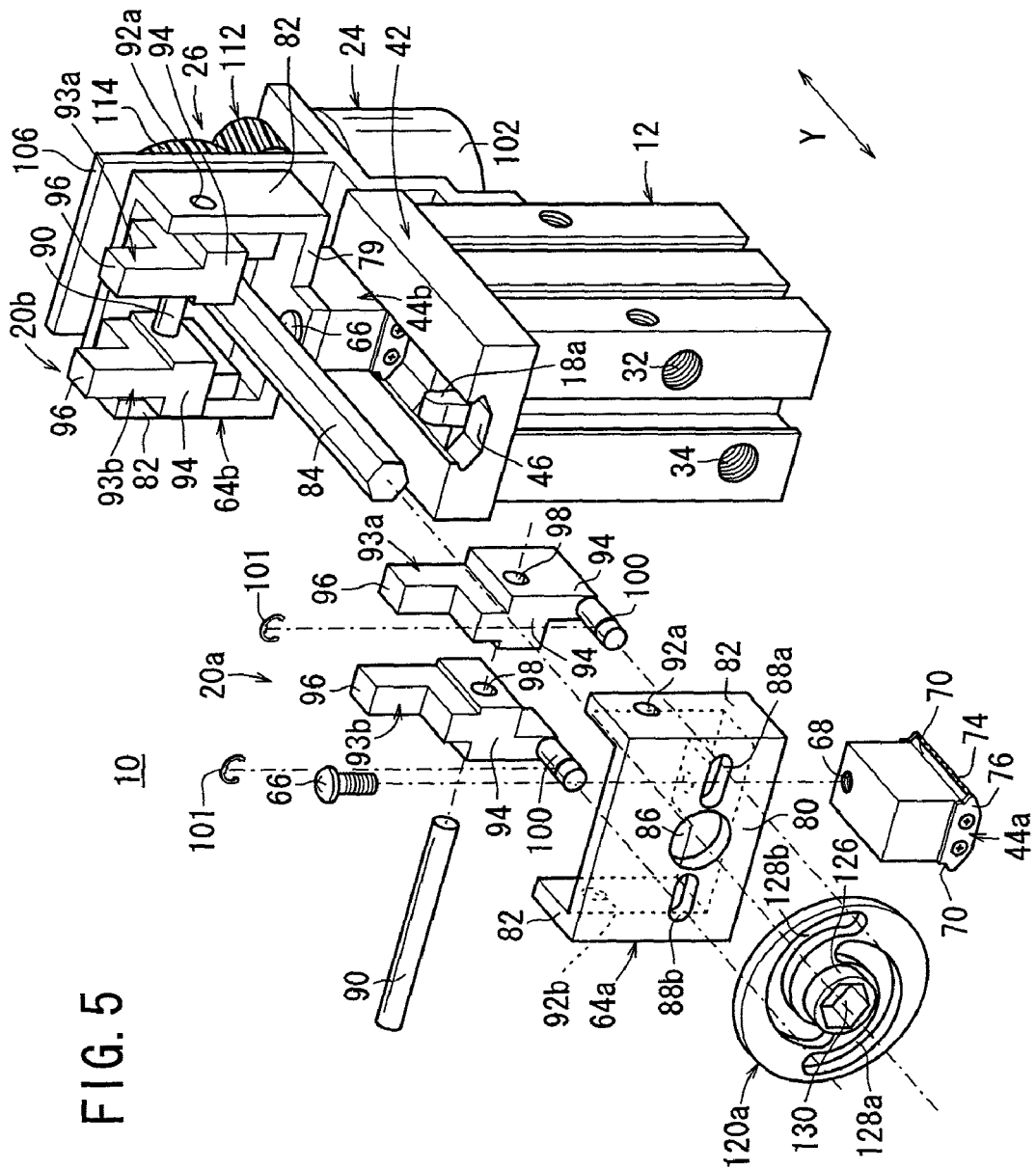
FIG. 5 is a partial exploded perspective view in which a gripping mechanism is disengaged from a chuck body and a base member, in relation to the chuck apparatus shown in FIG. 1.
Figure 6:
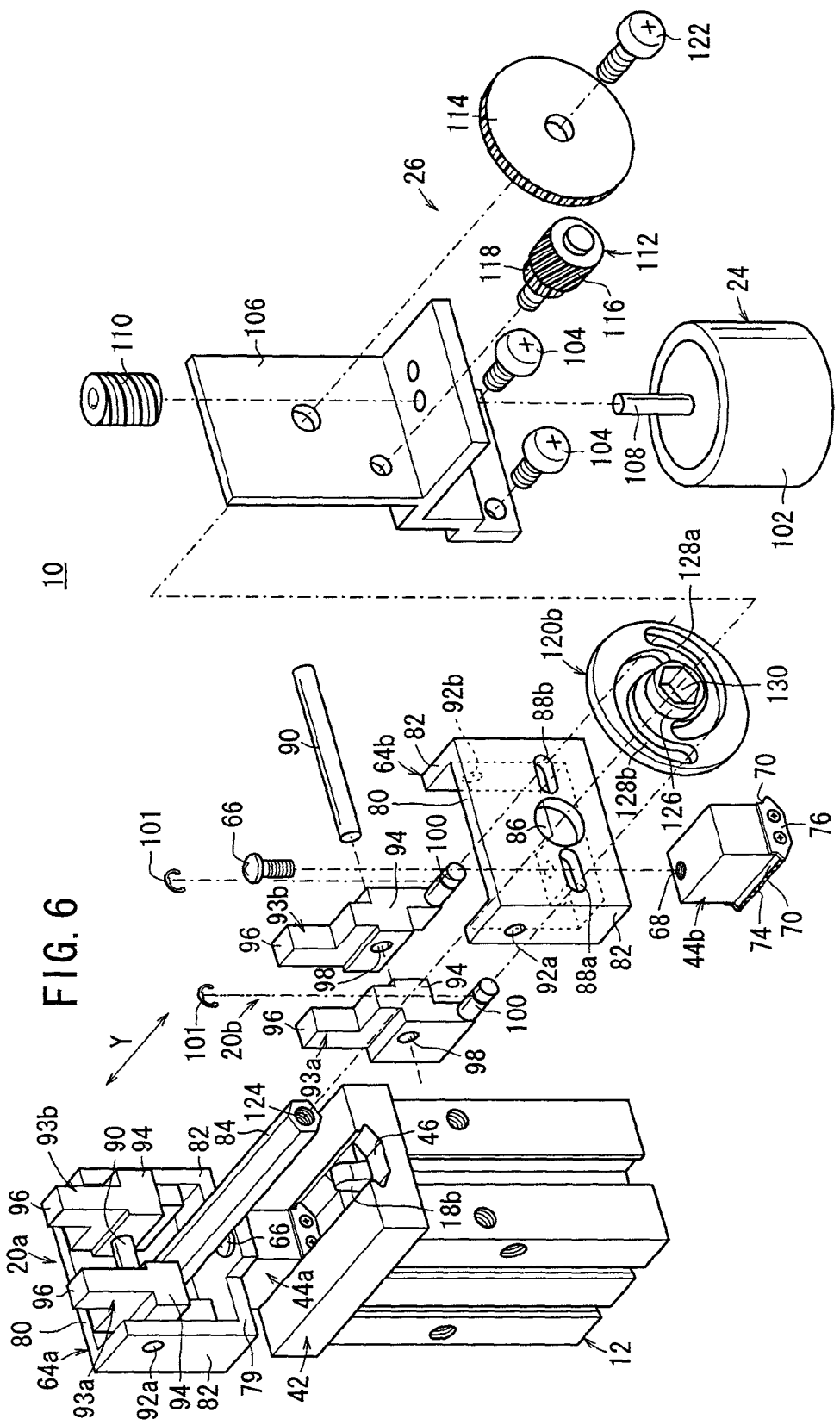
FIG. 6 is a partial exploded perspective view in which a driving section and the gripping mechanism are disengaged from the chuck body and the base member, in relation to the chuck apparatus shown in FIG. 2.

As shown in FIGS. 5 and 6, the gripping mechanism 22 includes the pair of displacement blocks 44a, 44b, which are displaceable along the rail groove 46 of the base member 42, a pair of holders 64a, 64b connected to the displacement blocks 44a, 44b respectively, and the gripping sections 20a, 20b, which are displaceable with respect to the holders 64a, 64b.

Bolts 66 are threaded into bolt holes 68 of the displacement blocks 44a, 44b, wherein the bolt holes 66 are formed on side surfaces opposed to the holders 64a, 64b. The holders 64a, 64b are connected by means of the bolts 66. Each of the displacement blocks 44a, 44b has an expanded width section 70, expanded in a widthwise direction, which engages with the rail groove 46, and a lever hole 72 open toward the rail groove 46 and into which the other ends of the levers 18a, 18b are inserted.

The expanded width section 70 is formed at the lower end of the displacement blocks 44a, 44b. A plurality of balls 74 are installed linearly into grooves, which are formed at both side portions of the expanded width section 70. Further, the balls 74 are retained in the grooves by cover plates 76, which are installed to the end surfaces of the displacement blocks 44a, 44b. The rail groove 46 is formed such that the cross-sectional shape thereof conforms to the expanded width section 70 of the displacement blocks 44a, 44b. When the displacement blocks 44a, 44b are inserted along the extending direction of the rail groove 46, the balls 74 retained by the expanded width section 70 abut against the inner wall surfaces of the rail groove 46. Accordingly, displacement resistance is reduced and mitigated while the displacement blocks 44a, 44b are displaced along the rail groove 46, and the displacement blocks 44a, 44b are displaced smoothly along the rail groove 46.

The levers 18a, 18b inserted into the lever holes 72 undergo rotary displacement through the link pins 60 under a displacement action of the piston 14. Accordingly, the other ends of the levers 18a, 18b are displaced so as to approach one another or separate from each other. Therefore, the pair of displacement blocks 44a, 44b are displaced linearly along the rail groove 46 in directions so as to approach one another or separate away from each other (in the direction of the arrows A1, A2 shown in FIG. 3). That is, stroke displacement of the piston 14 is converted into a displacement substantially in the horizontal direction (direction of the arrow Y), substantially perpendicular to the displacement direction of the piston 14 (direction of the arrows X1, X2), by the pair of levers 18a, 18b. Stated otherwise, the stroke displacement is converted into displacement in a direction (direction of the arrows A1, A2) such that the displacement blocks 44a, 44b approach or separate away from each other.

Each of the holders 64a, 64b has a U-shaped cross section, comprising a bottom wall section 79, with a hole 78 for inserting the bolts 66 thereinto, an upstanding side wall section 80 provided substantially perpendicularly with respect to the bottom wall section 79, and a pair of brim sections 82, which protrude from respective ends of the side wall section 80. The bolts 66 are inserted into the holes 78 in the bottom wall sections 79, such that the bolts 66 are threaded into the bolt holes 68 of the displacement blocks 44a, 44b. Accordingly, the holders 64a, 64b are connected to the displacement blocks 44a, 44b such that the holders 64a, 64b are displaceable along the rail groove 46 together with the displacement blocks 44a, 44b.

An insertion hole 86, into which a rotary shaft (rotation shaft) 84 is inserted as described later on, is formed through a substantially central portion of the side wall section 80 of each of the holders 64a, 64b. Further, a pair of guide grooves 88a, 88b, which extend in directions separating away from the insertion hole 86 respectively, are formed on both side portions about the center of the insertion hole 86. The guide grooves 88a, 88b are arranged substantially symmetrically about the center of the insertion hole 86, each of which is formed with a slotted hole extending substantially in the horizontal direction (see FIGS. 4, 5, and 6).

A pair of upright brim sections 82 are disposed substantially perpendicularly with respect to the side wall section 80 and the bottom wall section 79, respectively. The pair of brim sections 82 have a pair of holding holes 92a, 92b therein, in which a guide shaft 90 is retained so as to support the gripping sections 20a, 20b. The holding holes 92a, 92b are disposed linearly along a straight line opposed to each of the brim sections 82 respectively. One end of the guide shaft 90 is retained by one holding hole 92a, while the other end of the guide shaft 90 is retained by the other holding hole 92b.

The pair of holders 64a, 64b are arranged substantially symmetrically about the center of the axis of the chuck body 12, such that the brim sections 82 are opposed to one another.

The pair of gripping sections 20a, 20b are provided for each of the holders 64a, 64b and each of the displacement blocks 44a, 44b. Each of the gripping sections 20a, 20b is composed of a pair of fingers (second gripping sections) 93a, 93b. Each of the fingers 93a, 93b includes a pawl 96, which protrudes from a block-shaped main body section 94 in order to grip a workpiece W (see FIG. 3), a guide hole 98 that penetrates through the main body section 94 for insertion of the guide shaft 90 therein, and a pin section (engaging section) 100, which protrudes in a substantially horizontal direction substantially perpendicular to the pawl 96. The fingers 93a, 93b are arranged such that the pin sections 100 are disposed on the side wall section 80 of each of the holders 64a, 64b. The pin sections 100 are inserted into each of the pair of guide grooves 88a, 88b respectively.

Disengagement-preventive rings 101 are installed in an annular groove formed on the outer circumferential surface of the pin section 100. The disengagement-preventive rings 101 are installed after the pin sections 100 have been inserted into cam grooves 128a, 128b of each of the cam plates 120a, 120b as described later on. Therefore, the pin sections 100 are prevented from disengaging from the cam plates 120a, 120b and the holders 64a, 64b.

That is, gripping section pairs 20a, 20b are provided for each of the pair of holders 64a, 64b respectively, wherein two pairs of gripping sections 20a, 20b are provided for the entire chuck apparatus 10. Further, two fingers 93a, 93b, which make up each of the gripping sections 20a, 20b, are provided for each of the holders 64a, 64b. Four fingers 93a, 93b are provided for the entire chuck apparatus 10.

Each of the gripping sections 20a, 20b, which includes the pair of fingers 93a, 93b provided for each of the other holders 64a, 64b, is formed in an identical shape. Therefore, only the gripping section 20a, 20b provided for the holder 64a, 64b disposed on one side shall be explained. Detailed explanations shall be omitted concerning the gripping section 20a, 20b provided for the holder 64a, 64b disposed on the other side.

The pair of fingers 93a, 93b have substantially symmetrical shapes about the center of the axis of the insertion hole 86 of the holders 64a, 64b. The fingers 93a, 93b are supported displaceably between the respective brim sections 82 by means of the guide shaft 90 retained by the holders 64a, 64b. Accordingly, the fingers 93a, 93b are displaced linearly along the rail groove 46 of the base member 42, together with the holders 64a, 64b and the displacement blocks 44a, 44b.

Figure 4:
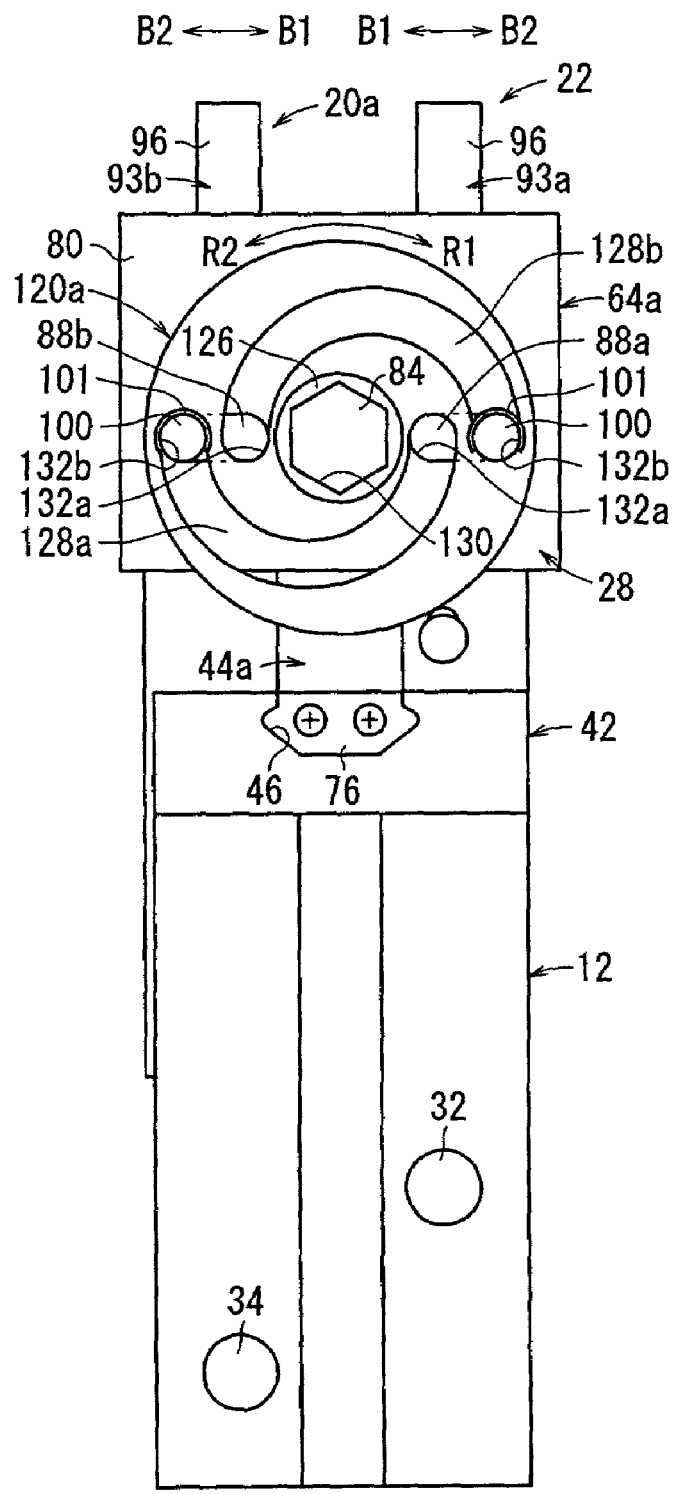
FIG. 4 is a side view illustrating the entire chuck apparatus shown in FIG. 1.
Figure 7:
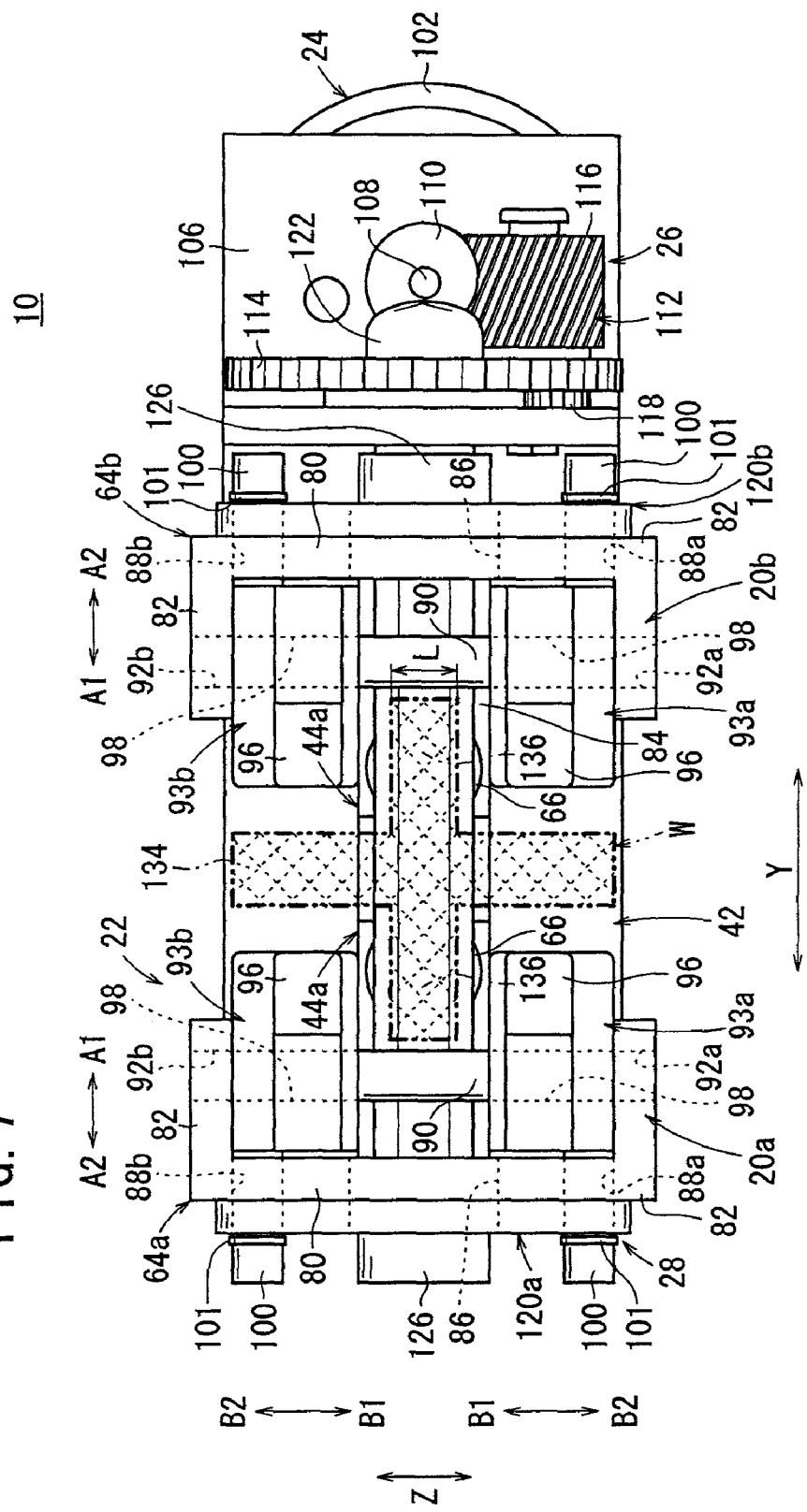
FIG. 7 is a plan view illustrating the chuck apparatus shown in FIG. 1.

The pin section 100 of one finger 93a is inserted into one guide groove 88a of the holder 64a, 64b, whereas the pin section 100 of the other finger 93b is inserted into the other guide groove 88b. The pin sections 100 are displaceable in substantially horizontal directions (directions of the arrows B1, B2 as shown in FIGS. 4 and 7) with respect to the holders 64a, 64b under a guiding action effected by the guide shaft 90.

That is, the gripping sections 20a, 20b are arranged substantially symmetrically about the center of the axis of the chuck body 12, such that of fingers 93a, 93b that constitute each of the gripping sections 20a, 20b are supported respectively so as to be displaceable with respect to the pair of holders 64a, 64b.

Figure 2:
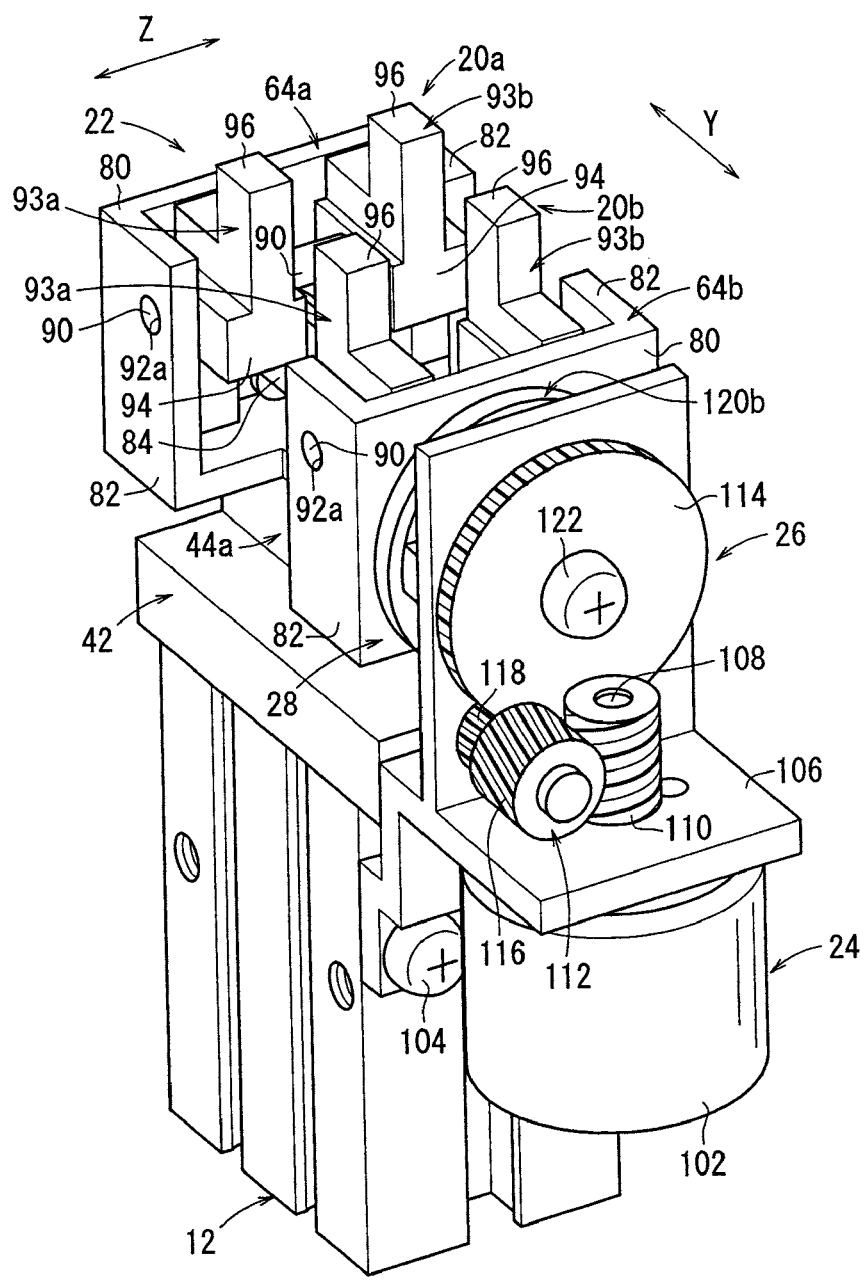
FIG. 2 is a perspective view illustrating an aspect in which the chuck apparatus shown in FIG. 1 is viewed from another direction.
Figure 3:
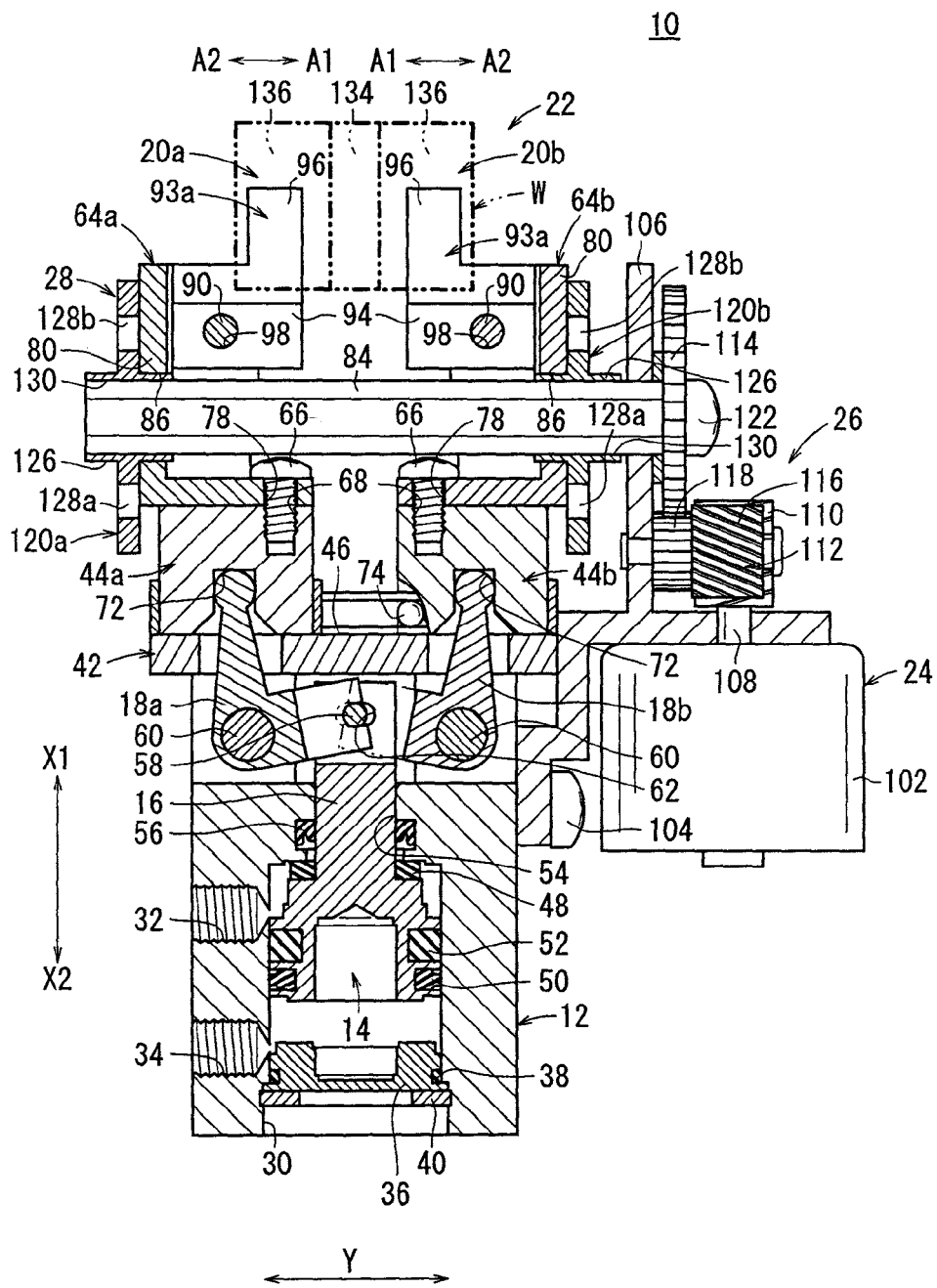
FIG. 3 is a vertical sectional view illustrating the entire chuck apparatus shown in FIG. 1.

As shown in FIGS. 2, 3, and 6, the driving section 24 is composed of a rotary driving source 102 (for example, a brushless motor), which is driven and rotated under the action of electric power applied from a power source. The rotary driving source 102 is installed on an attachment bracket 106, which is fixed to a side portion of the chuck body 12 by means of fixing bolts 104. A drive shaft 108 of the rotary driving source 102 is provided substantially in parallel with the axis of the chuck body 12. A driving gear 110, which constitutes the gear mechanism 26, is installed at a forward end and is inserted into the attachment bracket 106.

The gear mechanism 26 includes the driving gear 110, which is composed of a worm gear and is installed to the drive shaft 108 of the rotary driving source 102, a sub-gear 112 that is enmeshed with the driving gear 110 and rotatably supported by the attachment bracket 106, and a main gear 114, which is enmeshed with the sub-gear 112 and is connected to the rotary shaft 84.

The sub-gear 112 includes a first gear section 116, which is disposed perpendicularly to the axis of the driving gear 110 and fitted to the driving gear 110, and a second gear section 118 disposed adjacent to the first gear section 116, which is enmeshed with the main gear 114. The first gear section 116 is composed of a worm gear, in the same manner as the driving gear 110 that is enmeshed therewith. A driving force is transmitted from the drive shaft 108 to the sub-gear 112, while the direction of transmission of the driving force is converted perpendicularly.

The driving force supplied from the rotary driving source 102 is transmitted from the driving gear 110 via the sub-gear 112 to the main gear 114. The rotary shaft 84, which is connected to the main gear 114, is driven and rotated by the driving force. Further, the driving force output from the rotary driving source 102 is subjected to speed reduction at a predetermined speed reduction ratio, and the driving force is output to the rotary shaft 84.

The cam mechanism 28 includes the rotary shaft 84, which is inserted into the insertion holes 86 formed through the pair of holders 64a, 64b respectively and which has one end connected to the main gear 114, and the pair of cam plates (rotary members) 120a, 120b, which are inserted into both ends of the rotary shaft 84 respectively and which are rotatable integrally with the rotary shaft 84.

For example, the rotary shaft 84 has a hexagonal cross section and extends a predetermined length in the axial direction (direction of the arrow Y). Specifically, the length of the rotary shaft 84 is established such that respective ends of the rotary shaft 84 can be retained in the insertion holes 86 of the holders 64a, 64b respectively, when the pair of holders 64a, 64b are displaced in directions that are maximally separated from each other (in the direction of the arrow A2) along the rail groove 46 of the base member 42. The rotary shaft 84 is disposed substantially in parallel such that the rotary shaft 84 faces the rail groove 46 of the base member 42.

The cam plates 120a, 120b are installed on both ends after the rotary shaft 84 has been inserted into the insertion holes 86 of the holders 64a, 64b.

As shown in FIG. 6, a screw hole 124 having a gear-fixing bolt 122 threaded therein is formed at one end of the rotary shaft 84. The gear-fixing bolt 122 is inserted into the main gear 114 and is threaded into the screw hole 124 via the attachment bracket 106 (see FIG. 2). Accordingly, the main gear 114 is connected to one end of the rotary shaft 84 in order to effect rotation in an integrated manner.

The pair of cam plates 120a, 120b each have a disk-shaped form, comprising a boss section 126 formed at a substantially central portion and into which the rotary shaft 84 is inserted, and a pair of cam grooves (grooves) 128a, 128b which have circular arc-shaped forms that are gradually widened in a radially outward direction about the center of the boss section 126.

The boss section 126 protrudes a predetermined length in the axial direction of the cam plates 120a, 120b. A shaft hole 130, which opens to provide a hexagonal cross section corresponding to the cross-sectional shape of the rotary shaft 84, is formed at a substantially central portion of the boss section 126. The rotary shaft 84 and the shaft hole 130, because they are formed with hexagonal cross sections, cannot be mutually displaced relative to each other in the direction of rotation. The cam plates 120a, 120b are always rotated and displaced integrally together with the rotary shaft 84 (in the directions of the arrows R1, R2 shown in FIG. 4).

The cross-sectional shapes of the rotary shaft 84 and the shaft hole 130 are not limited to hexagonal cross sections. Any shape may be adopted, which does not have a circular cross section and which is capable of restricting mutual relative displacement therebetween.

As shown in FIG. 4, one end 132a of each of the cam grooves 128a, 128b is formed on the inner circumferential side of each of the cam plates 120a, 120b and disposed adjacent to the boss section 126. The other end 132b of each of the cam grooves 128a, 128b is formed on the outer circumferential side of each of the cam plates 120a, 120b, on sides opposite to the one ends 132a, with the boss section 126 intervening therebetween. The ends 132a, 132b of the cam grooves 128a, 128b are arranged substantially along a straight line, with the boss section 126 intervening therebetween. A space disposed between the ends 132a, 132b of the cam grooves 128a, 128b is connected, so as to provide a circular arc-shaped form having a predetermined radius.

The cam grooves 128a, 128b are formed with symmetrical shapes and are disposed at positions obtained by being mutually rotated by 180° about the center of the boss section 126.

In addition, an arrangement is provided in which one end 132a of each of the cam grooves 128a, 128b faces the inner end of the guide grooves 88a, 88b of the holders 64a, 64b, which are disposed on the side of the insertion hole 86. The other end 132b of each of the cam grooves 128a, 128b faces the outer end of the guide grooves 88a, 88b, which are separated from the insertion hole 86.

That is, when the cam plates 120a, 120b make rotary displacement together with the rotary shaft 84, the cam grooves 128a, 128b are continuously kept in a state of communication with the guide grooves 88a, 88b between the inner and outer ends of the guide grooves 88a, 88b. Further, the portions of communication are changed in accordance with rotary displacement of the cam plates 120a, 120b between the inner and outer ends.

In other words, when the cam plates 120a, 120b are rotated, the pin sections 100 of the gripping sections 20a, 20b, which are inserted into the guide grooves 88a, 88b and the cam grooves 128a, 128b, are guided by the cam grooves 128a, 128b toward the inner or outer circumferential side of the cam plates 120a, 120b. The pin sections 100 are displaced in a substantially horizontal direction (direction of the arrow Z) along the guide grooves 88a, 88b.

In this arrangement, the pair of cam grooves 128a, 128b are arranged at symmetrical positions obtained by being mutually rotated by 180° about the center of the boss section 126. Therefore, the fingers 93a, 93b of the gripping sections 20a, 20b, in which the pin sections 100 are inserted respectively into the cam grooves 128a, 128b, are displaced in mutually opposite directions. That is, the fingers 93a, 93b are displaced in directions (directions of the arrows B1, B2) so as to approach or separate away from each other, under a guiding action effected by the guide shaft 90.

The chuck apparatus 10 according to the embodiment of the present invention is basically constructed as described above. Next, operations, functions and effects thereof shall be explained. An initial state is defined as a non-gripped state of the workpiece W, in which the piston 14 is moved upwardly to the side of the gripping mechanism 22 (in the direction of the arrow X1), and the pair of gripping sections 20a, 20b are in an open state as shown in FIG. 3. In this state, the pair of fingers 93a, 93b making up the gripping sections 20a, 20b are in an open state, in which they are displaced and separated from each other as shown in FIG. 7.

An explanation shall now be given concerning a case in which a workpiece W, which has a protruding section 136 that protrudes a predetermined width L with respect to a flat surface section 134, is gripped by the chuck apparatus 10.

At first, the fingers 93a, 93b of the gripping sections 20a, 20b are displaced, depending on the shape of the protruding section 136 of the workpiece W, under a driving action of the driving section 24. The fingers 93a, 93b are positioned at the gripping portion of the workpiece W to be gripped.

In this situation, current supplied from an unillustrated power source is applied as a control signal (pulse signal) to the rotary driving source 102 via a controller. The driving gear 110, which constitutes the gear mechanism 26, is rotated through the drive shaft 108 under the driving action of the rotary driving source 102. Accordingly, the main gear 114 is rotated via the sub-gear 112, which is meshed with the driving gear 110. The driving force supplied from the rotary driving source 102 is subjected to speed reduction by a predetermined amount by means of the gear mechanism 26, and the driving force is transmitted to the rotary shaft 84, which is connected to the main gear 114.

The driving force is transmitted from the main gear 114 to the rotary shaft 84, whereby the rotary shaft 84 is rotated. Accordingly, the cam plates 120a, 120b are rotated in identical directions (for example, in the direction of the arrow R1 shown in FIG. 4).

In other words, the cam plates 120a, 120b are disposed in a state such that the pin sections 100 are positioned on sides of the other ends 132b of the cam grooves 128a, 128b. The cam plates 120a, 120b are rotated in a direction so that the pin sections 100 are guided toward one end 132a of the cam grooves 128a, 128b. Accordingly, the pin sections 100 are guided toward the inner circumferential sides of the cam plates 120a, 120b along the cam grooves 128a, 128b of the cam plates 120a, 120b. The pin sections 100 are displaced in directions (directions of the arrow B1) so as to approach each other from the outer end toward the inner end, under an engaging action with respect to the guide grooves 88a, 88b.

Figure 8:
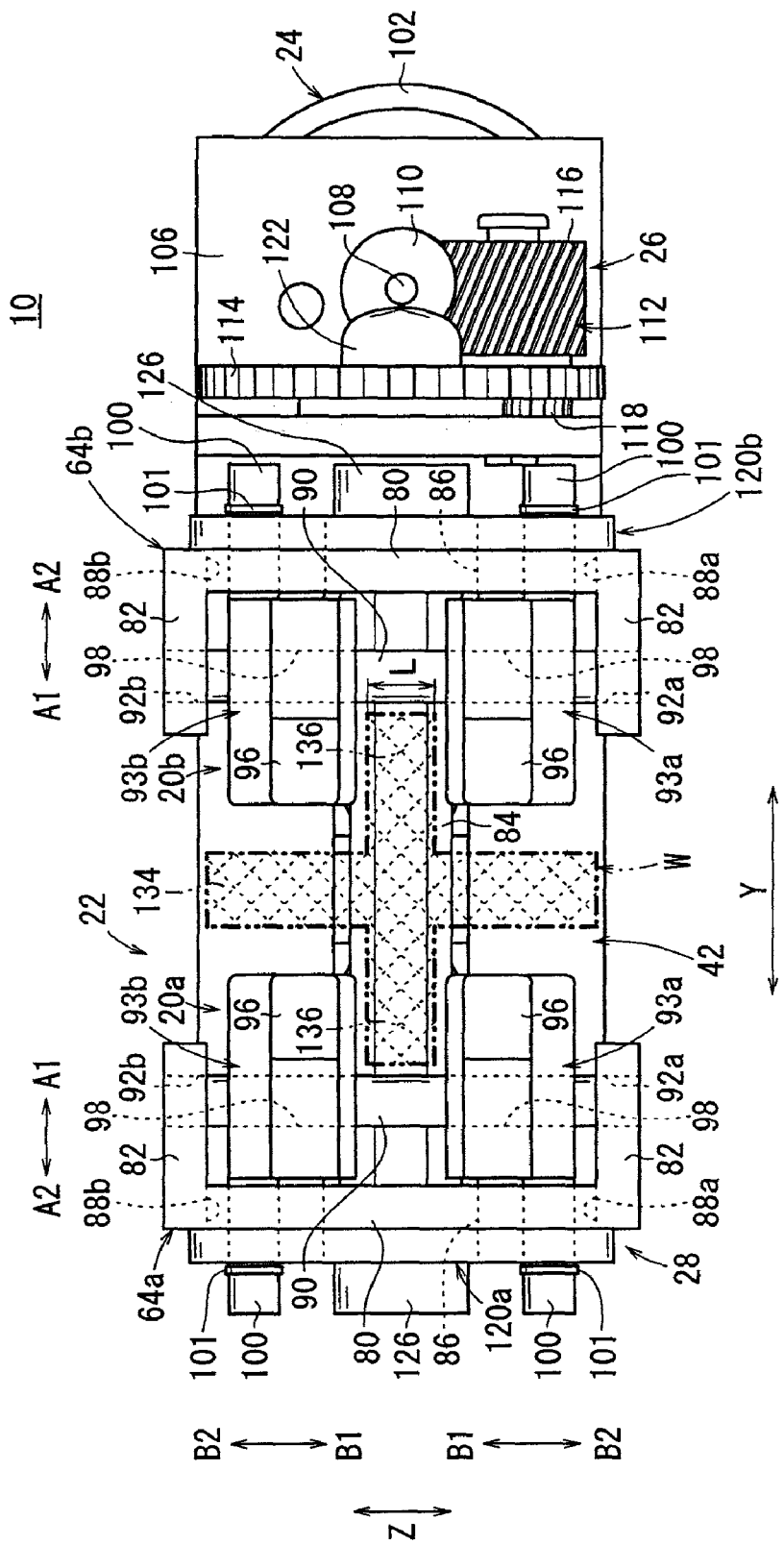
FIG. 8 is a plan view illustrating a state in which the gripping mechanism performs a closing operation under a driving action of the driving section, and wherein positioning is effected depending on the shape of a workpiece, in relation to the chuck apparatus shown in FIG. 7.

As a result, the pair of fingers 93a, 93b, with the pin sections 100 are displaced substantially horizontally in directions (directions of the arrow B1) to approach one another, under a guiding action effected by the guide shaft 90, which is retained by the holders 64a, 64b (see FIG. 8). In this situation, the displacement speeds and amounts of the fingers 93a, 93b are identical to each other.

As shown in FIG. 8, the fingers 93a, 93b are displaced in directions to approach one another, whereupon they arrive at desired positions at which they are separated predetermined distances from the protruding section 136 of the workpiece W. After that, supply of current to the driving section 24 is stopped. Accordingly, the pawls 96 of the fingers 93a, 93b are positioned in a non-contact state with respect to the protruding section 136 of the workpiece W. In this arrangement, the driving gear 110 and the sub-gear 112, which make up the gear mechanism 26, are worm gears. Therefore, rotary driving is locked when the driving force is not transmitted from the driving section 24. Accordingly, the gripping sections 20a, 20b, which include the positioned fingers 93a, 93b, do not perform an opening/closing operation. The gripping sections 20a, 20b are retained in a state in which they are positioned with respect to the workpiece W.

Subsequently, the workpiece W is gripped by the gripping sections 20a, 20b, which include the fingers 93a, 93b positioned at desired positions with respect to the workpiece W.

Figure 9:
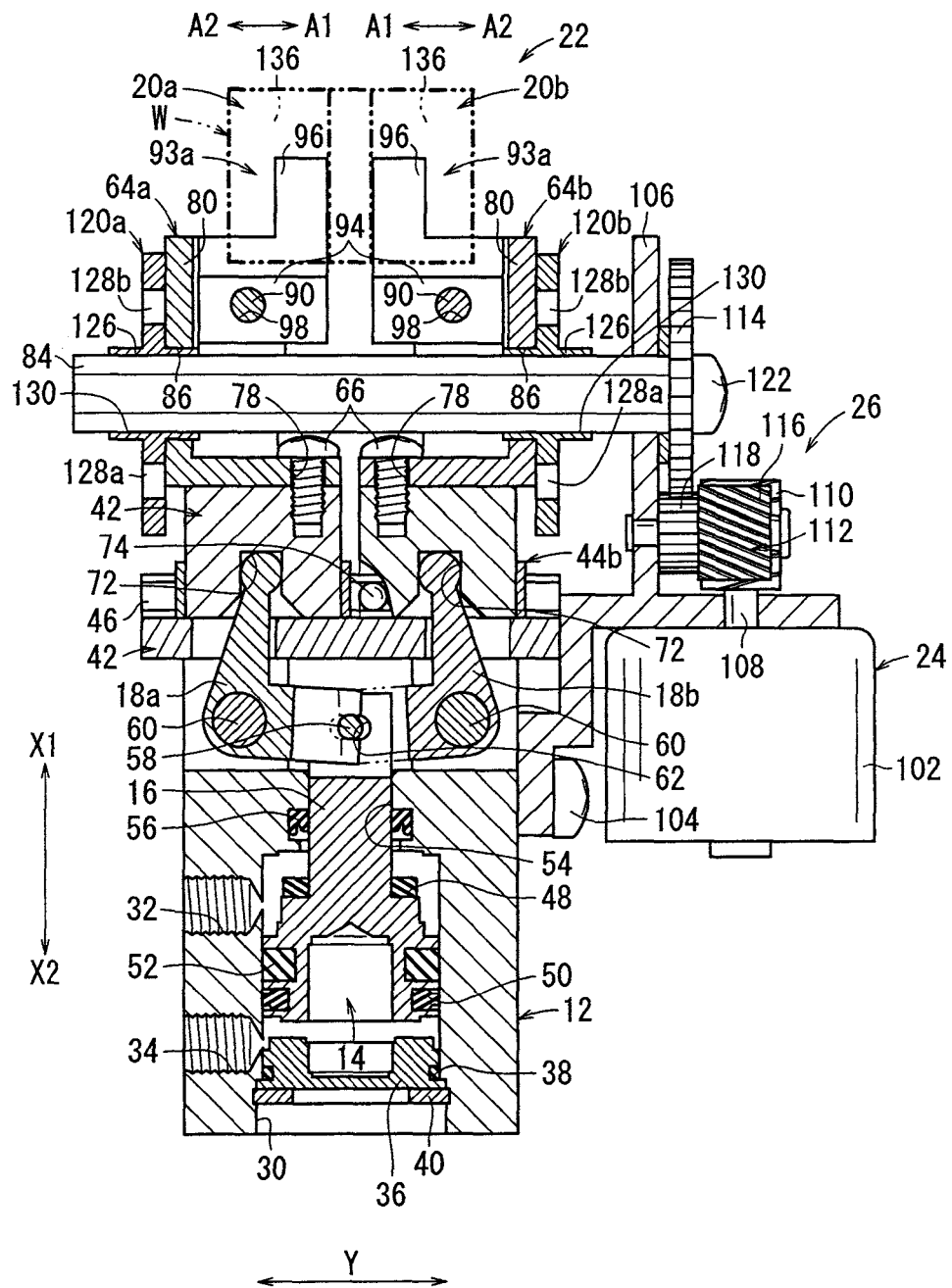
FIG. 9 is an entire vertical sectional view illustrating a state in which the gripping mechanism performs a closing operation by means of supplying a pressure fluid, and wherein the workpiece is gripped by a pair of gripping sections, in relation to the chuck apparatus shown in FIG. 3.

Starting from the initial state shown in FIG. 3, pressure fluid is supplied to the first port 32. Accordingly, as shown in FIG. 9, the piston 14 is displaced in a direction (direction of the arrow X2) that separates away from the gripping mechanism 22, wherein one end of each of the pair of levers 18a, 18b, which engages with the rod section 16 of the piston 14, is pulled downwardly. In this situation, the second port 34 is placed in a state of being open to atmospheric air. Accordingly, the levers 18a, 18b are rotated in directions such that the other ends approach one another, about the support points of the link pins 60, respectively. The displacement blocks 44a, 44b, with which the other ends are engaged, are displaced substantially horizontally, along the rail groove 46 of the base member 42, in directions (directions of the arrow A1) that approach one another.

Figure 10:
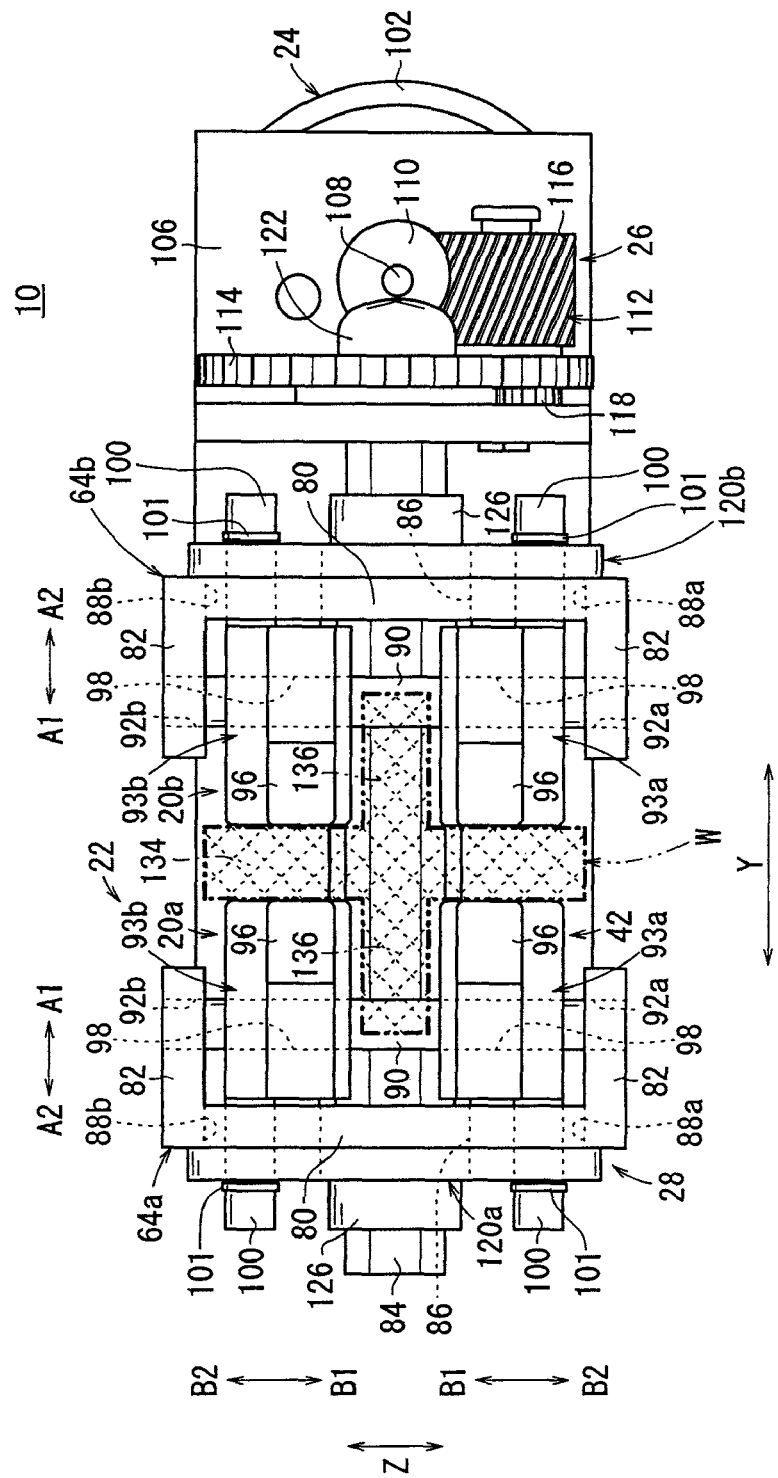
FIG. 10 is a plan view illustrating the chuck apparatus shown in FIG. 9.

The pair of holders 64a, 64b are displaced integrally under a displacement action of the pair of displacement blocks 44a, 44b, whereby the gripping sections 20a, 20b retained by the holders 64a, 64b are displaced in directions (directions of the arrow A1) to approach one another. As a result, the gripping sections 20a, 20b abut against both side surfaces of the flat surface section 134 of the workpiece W, as shown in FIGS. 9 and 10. The flat surface section 134 is interposed between and gripped at a predetermined pressure by the fingers 93a, 93b of the gripping sections 20a, 20b.

In this situation, the fingers 93a, 93b are positioned beforehand at positions separated predetermined distances with respect to the protruding section 136 of the workpiece W. Therefore, even when the workpiece W is gripped by the gripping sections 20a, 20b, the workpiece W is gripped in a state wherein the gripping sections 20a, 20b are separated from the protruding section 136 by such predetermined distances.

On the other hand, when the workpiece W is released from the gripped state brought about by the gripping sections 20a, 20b, the pressure fluid that has been supplied through the first port 32 is supplied instead to the second port 34, under a switching action effected by an unillustrated directional control valve, whereas the first port 32 is placed in a state of being open to atmospheric air. Accordingly, the piston 14 is displaced toward the gripping mechanism 22 (in the direction of the arrow X1) under a pressing action of the pressure fluid, which is introduced into the through-hole 30 from the second port 34. Accordingly, the pair of levers 18a, 18b that engage with the rod section 16 are rotated in directions such that the other ends thereof are separated from each other about the support points of the link pins 60 (see FIG. 3).

Therefore, the pair of displacement blocks 44a, 44b that engage with the levers 18a, 18b are displaced substantially horizontally along the rail groove 46 of the base member 42 in directions (directions of the arrow A2) so as to separate away from each other. The pair of gripping sections 20a, 20b, which have gripped the workpiece W, are also displaced in directions so as to separate away from each other, and accordingly, the workpiece W is released from the gripped state.

As described above, in the embodiment of the present invention, a pair of gripping sections 20a, 20b are provided, which perform opening and closing operations under the supply action of a pressure fluid, wherein the workpiece W can be gripped by the gripping sections 20a, 20b. Further, a pair of fingers 93a, 93b making up each of the gripping sections 20a, 20b can successfully perform opening and closing operations freely, in directions substantially perpendicular to the opening/closing directions of the gripping sections 20a, 20b, under a driving action effected by the driving section 24, which is driven through application of electrical power thereto. That is, the gripping sections 20a, 20b perform opening/closing operations in an axial direction (direction of the arrow Y) of the rotary shaft 84 and the rail groove 46, by means of the pressure fluid. The fingers 93a, 93b that make up the gripping sections 20a, 20b can successfully perform opening/closing operations in a direction (direction of the arrow Z), which is substantially perpendicular to the axis of the rotary shaft 84 and the rail groove 46, under a driving action effected by the driving section 24.

The opening/closing operation of the gripping sections 20a, 20b effected by the pressure fluid can be performed distinctly and independently from the opening/closing operation of the fingers 93a, 93b, which is effected by the driving section 24.

Accordingly, the fingers 93a, 93b can be displaced under a driving action of the driving section 24 in order to position the fingers 93a, 93b at a desired gripping position for the workpiece W, and before the workpiece W is gripped by the gripping sections 20a, 20b. Therefore, when the workpiece W is gripped by the gripping sections 20a, 20b by means of the pressure fluid, the workpiece W can be gripped at a desired gripping position. As a result, various workpieces W having different shapes can be gripped using the single chuck apparatus 10, such that the gripping sections 20a, 20b including the fingers 93a, 93b are positioned at desired positions depending on the shapes of the various workpieces W.

More specifically, the number of operation steps can be reduced and the equipment can be simplified, as compared with a conventional system, for gripping various differently shaped workpieces, which hitherto has been performed by combining a plurality of chuck apparatuses.

In the gripping mechanism 22, the pair of gripping sections 20a, 20b perform the opening/closing operation in directions to approach one another or to separate from each other by means of the pressure fluid. Further, the fingers 93a, 93b that constitute the gripping sections 20a, 20b perform opening and closing operations by means of the driving force supplied from the driving section 24. As a result, positioning of the gripping portion, which is performed by the fingers 93a, 93b depending on the shape of the workpiece W, can be performed highly accurately using the driving action of the rotary driving source 102, which is driven in accordance with electrical signals. Further, when the workpiece W is gripped, a large gripping force is obtained as a result of the pressing action effected by the pressure fluid. That is, when the fingers 93a, 93b are positioned, a driving force supplied from the driving section 24 is used. When the workpiece W is gripped, the driving force brought about by the pressure fluid is used, so that gripping of the workpiece W can be performed efficiently.

The chuck apparatus 10 has been explained above with respect to a case in which the fingers 93a, 93b are displaced under the driving action of the driving section 24, so as to position the gripping sections 20a, 20b with respect to the workpiece W beforehand, and thereafter the workpiece W is gripped by the gripping sections 20a, 20b. However, the present invention is not limited to such features. Alternatively, positioning of the fingers 93a, 93b may be performed substantially simultaneously with gripping of the workpiece W by the gripping sections 20a, 20b.

The fingers 93a, 93b may be displaced and positioned, for example, such that the fingers 93a, 93b abut against the protruding section 136 of the workpiece W.

On the other hand, the chuck apparatus 10 described above is constructed such that the opening/closing operation of the gripping sections 20a, 20b making up the gripping mechanism 22 is performed by a pressure fluid that is supplied to the chuck body 12, and wherein the pair of fingers 93a, 93b are opened and closed as a result of the driving action of the driving section 24. However, a driving section (first driving section), which is distinct from the driving section (second driving section), may also be provided, in which case the opening/closing operation of the gripping sections 20a, 20b can be performed by such a distinct driving section. In this arrangement, the opening/closing operation performed by the gripping mechanism 22 of the chuck apparatus 10 can be controlled by means of electric signals only, whereby the configuration thereof can be simplified. Further, the opening/closing operation can be controlled highly accurately.

It is a matter of course that the chuck apparatus according to the present invention is not limited to the embodiment described above. The present invention may be embodied in various other forms without deviating from the gist or essential characteristics of the present invention.

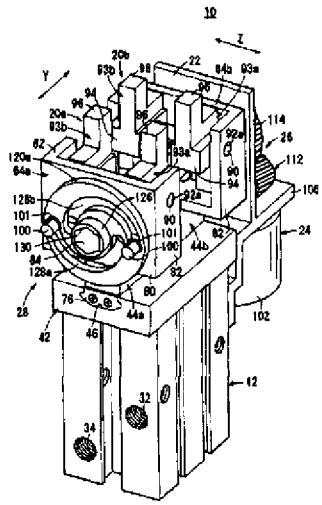

What is claimed is:

1. A chuck apparatus for gripping a workpiece by means of an openable/closable gripping mechanism, said chuck apparatus comprising:
    a body having a pair of ports for supplying a pressure fluid, said body including a piston installed internally therein, which is displaceable in an axial direction under action of said pressure fluid supplied through said ports;
    a driving section connected to said body and which is driven and rotated by an electric signal; and
    a gripping mechanism having a pair of first gripping sections and a pair of second gripping sections, said pair of first gripping sections being connected to said piston and being openable and closable under a displacement action of said piston, and said pair of second gripping sections being openable and closable under a driving action of said driving section so as to be opened and closed in directions perpendicular to opening and closing directions of said first gripping sections.

2. The chuck apparatus according to claim 1, further comprising:
    a converting mechanism provided between said driving section and said second gripping sections, which converts a rotational driving force of said driving section into rectilinear motion of said second gripping sections, wherein said converting mechanism includes:
    a rotary shaft which is driven and rotated together with said driving section;
    a rotary member having circular arc-shaped grooves that engage with engaging sections of said second gripping sections, wherein said rotary member is rotatable together with said rotary shaft; and
    guide grooves extending in a horizontal direction about a center of said rotary shaft and into which said engaging sections are inserted.

3. The chuck apparatus according to claim 2, wherein said engaging sections are displaced along said guide grooves under a rotary action of said rotary member engaged via said grooves, and said second gripping sections are displaced together with said engaging sections.

4. The chuck apparatus according to claim 3, wherein said rotary member is engaged with said rotary shaft so as to be displaceable in said axial direction, and relative displacement is regulated in a direction of rotation with respect to said rotary shaft.

5. The chuck apparatus according to claim 4, wherein said rotary shaft is fitted into a fitting hole formed in a central portion of said rotary member.

6. The chuck apparatus according to claim 2, wherein said groove gradually widens in diameter in a radially outward direction about a center of a central portion of said rotary member.

7. The chuck apparatus according to claim 2, wherein said first gripping sections are displaceable along a rail groove disposed on said body.

8. The chuck apparatus according to claim 7, wherein said second gripping sections are supported displaceably by means of a guide shaft of a holder that constitutes said first gripping sections.

9. A chuck apparatus for gripping a workpiece by means of an openable/closable gripping mechanism, said chuck apparatus comprising:
    a body;
    a first driving section connected to said body and which is driven and rotated by an electric signal; and
    a gripping mechanism having a pair of first gripping sections and a pair of second gripping sections, said pair of first gripping sections being openable and closable by a driving force provided by said first driving section, and said pair of second gripping sections being openable and closable under a driving action of a second driving section distinct from said first driving section so as to be opened and closed in directions perpendicular to opening and closing directions of said first gripping sections.

* * * * *

UNITED STATES PATENT AND TRADEMARK OFFICE
CERTIFICATE OF CORRECTION

PATENT NO.       : 8,123,234 B2
APPLICATION NO.  : 11/774981
DATED            : February 28, 2012
INVENTOR(S)      : Tomita et al.

Page 1 of 1

It is certified that error appears in the above-identified patent and that said Letters Patent is hereby corrected as shown below:

Col. 12, line 32, cancel claim 9.

Signed and Sealed this
Twenty-sixth Day of June, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,123,234 B2 | Page 1 of 2 |
| APPLICATION NO. | : 11/774981 | |
| DATED | : February 28, 2012 | |
| INVENTOR(S) | : Tomita et al. | |

It is certified that error appears in the above-identified patent and that said Letters Patent is hereby corrected as shown below:

Delete the Title page and substitute therefore the attached Title page showing the corrected number of claims in the patent.

Col. 12, lines 32-46, cancel claim 9.

This certificate supersedes the Certificate of Correction issued June 26, 2012.

Signed and Sealed this
Thirty-first Day of July, 2012

David J. Kappos
*Director of the United States Patent and Trademark Office*

(12) United States Patent
Tomita et al.

(10) Patent No.: US 8,123,234 B2
(45) Date of Patent: Feb. 28, 2012

(54) CHUCK APPARATUS

(75) Inventors: Seiji Tomita, Yokosuka (JP); Motohiro Sotome, Ayase (JP)

(73) Assignee: SMC Kabushiki Kaisha, Tokyo (JP)

( * ) Notice: Subject to any disclaimer, the term of this patent is extended or adjusted under 35 U.S.C. 154(b) by 1230 days.

(21) Appl. No.: 11/774,981

(22) Filed: Jul. 9, 2007

(65) Prior Publication Data

US 2008/0023925 A1 Jan. 31, 2008

(30) Foreign Application Priority Data

Jul. 31, 2006 (JP) .................. 2006-208994

(51) Int. Cl.
  B23B 31/30 (2006.01)
  B23B 31/163 (2006.01)
  B25J 15/00 (2006.01)

(52) U.S. Cl. ...... 279/4.12; 279/114; 279/116; 279/134; 279/137; 269/164; 294/207; 901/31

(58) Field of Classification Search ............. 279/4.01, 279/4.1, 4.12, 110, 114, 116, 134, 137; 269/110, 269/118, 164; 294/207; 901/31, 37–39; B23B 31/30, 31/163; B25J 15/00
See application file for complete search history.

(56) References Cited

U.S. PATENT DOCUMENTS

| | | | | |
|---|---|---|---|---|
| 2,938,733 A | * | 5/1960 | Judelson | 279/137 |
| 3,751,053 A | * | 8/1973 | Swanson | 279/119 |
| 3,797,837 A | * | 3/1974 | Roddy et al. | 279/114 |
| 3,975,030 A | * | 8/1976 | Akeel et al. | 279/4.12 |
| 4,482,162 A | * | 11/1984 | Anegawa | 279/4.12 |
| 5,551,677 A | | 9/1996 | Puettmer et al. | |
| 5,657,534 A | | 8/1997 | Yi | |
| 5,944,326 A | * | 8/1999 | Ishibashi et al. | 279/4.04 |
| 6,220,608 B1 | * | 4/2001 | Varnau | 279/114 |
| 6,460,862 B1 | * | 10/2002 | Shimizu | 279/4.12 |
| 6,467,775 B1 | * | 10/2002 | Denzinger | 279/4.12 |
| 6,601,856 B2 | * | 8/2003 | Bohler | 279/4.01 |
| 2004/0187301 A1 | | 9/2004 | Matsumura et al. | |
| 2009/0127879 A1 | * | 5/2009 | Maffeis | 294/88 |

FOREIGN PATENT DOCUMENTS

| | | |
|---|---|---|
| DE | 92 18 907 | 2/1996 |
| DE | 10 2004 014 567 | 12/2005 |
| JP | 02-139086 | 11/1990 |
| JP | 06-226658 | 8/1994 |
| JP | 07-205080 | 8/1995 |
| JP | 08-130396 | 5/1996 |
| JP | 09-109081 | 4/1997 |
| JP | 2004-174702 | 6/2004 |
| JP | 2004-215771 | 8/2004 |
| JP | 2005-59118 | 3/2005 |
| JP | 2005-118931 | 5/2005 |
| JP | 2005-161454 | 6/2005 |
| KR | 10-0297675 | 5/2001 |

* cited by examiner

*Primary Examiner* — Eric A Gates

(74) *Attorney, Agent, or Firm* — Paul A. Guss

(57) ABSTRACT

A pair of gripping sections performs opening and closing operations along a base member through displacement of a piston by means of a pressure fluid supplied to a chuck body. A pair of fingers, which constitute the gripping sections, is openable and closable in directions perpendicular to opening/closing directions of the gripping sections, by means of a driving force supplied from a driving section. The gripping sections are positioned with respect to a workpiece by actuating the pair of fingers to perform the opening/closing operation. Thereafter, by supplying the pressure fluid, the workpiece is gripped at a desired gripping position by means of the gripping sections.

8 Claims, 10 Drawing Sheets